United States Patent [19]

Staudt

[11] 4,299,052
[45] Nov. 10, 1981

[54] TREE ANCHORING DEVICE

[76] Inventor: Arnold P. Staudt, Box 57, Marble Rock, Iowa 50653

[21] Appl. No.: 116,040

[22] Filed: Jan. 28, 1980

[51] Int. Cl.³ .............................................. A01G 17/06
[52] U.S. Cl. ..................................................... 47/43
[58] Field of Search ............................. 47/41.2, 42–47

[56] References Cited

U.S. PATENT DOCUMENTS

| 551,000 | 12/1859 | Parker | 47/47 |
|---|---|---|---|
| 899,946 | 9/1908 | Browne | 47/47 |
| 933,112 | 9/1909 | Rieman | 47/47 |
| 2,298,069 | 10/1942 | Reading | 47/43 |
| 2,501,255 | 3/1950 | Bell | 248/44 |
| 3,010,256 | 11/1961 | Ise | 47/42 |
| 3,494,072 | 2/1970 | Olson | 47/44 |
| 3,505,761 | 4/1970 | Prieur | 47/43 |
| 3,521,401 | 7/1970 | Shisler | 47/43 |
| 3,526,056 | 9/1970 | Stropkay | 47/42 |
| 4,096,662 | 6/1978 | Anderson | 47/70 |

FOREIGN PATENT DOCUMENTS

| 598342 | 6/1934 | Fed. Rep. of Germany | 47/43 |
|---|---|---|---|
| 1957603 | 5/1971 | Fed. Rep. of Germany | 47/47 |
| 15568 | of 1904 | United Kingdom | 47/47 |

Primary Examiner—James R. Feyrer
Attorney, Agent, or Firm—Zarley, McKee, Thomte, Voorhees & Sease

[57] ABSTRACT

A tree anchoring device includes an upright elongated support rod having a plurality of circumferentially spaced apart foot members at the lower end thereof. Each foot member includes an outwardly directed first prong and a downwardly directed second prong adapted for insertion into the ground to provide wide base support for the upstanding rod. A pair of diverging contact fingers extend outwardly from the support rod for receiving a tree trunk therebetween and supporting the tree trunk in spaced relation from the support rod. The contact fingers define a generally V-shaped channel having an open side through which the tree trunk is received. Furthermore, the contact fingers may be formed of a resilient spring material and be releasably clamped together onto the support rod so as to be vertically adjustable thereon.

6 Claims, 4 Drawing Figures

TREE ANCHORING DEVICE

BACKGROUND OF THE INVENTION

The present invention is directed generally to apparatus for supporting young trees and more particularly to a wide base tree support apparatus having only a single member extending upwardly from the ground and height adjustable diverging fingers between which the tree is positioned and maintained in space relation from the support member.

It is a common practice to stabilize the relatively frail trunks of young trees both to guard against breakage by the wind and to assure straight vertical development for aesthetic landscaping purposes. Such stabilizing is generally accomplished by a plurality of wires, ropes or the like which are looped about the tree trunk at one end and anchored into the ground at the outer ends thereof. Such wires provide a safety hazard to unsuspecting people who may trip over them and, in any event, present multiple obstacles to a lawnmower. Stability may also be provided by a stake driven into the ground in parallel relation to the tree trunk with some sort of tie means between the tree trunk and stake. But the lack of wide base support for a single stake compromises the stability of the stake itself and the tie means generally require intricate knots or looping techniques which tend to make their installation rather inconvenient and time consuming. The structural integrity of a single stake can be improved by a tripod arrangement wherein three downwardly diverging legs are anchored into the ground but this arrangement presents obstacles to a lawnmower much like the wires mentioned above.

Accordingly, a primary object of the present invention is to provide an improved tree anchoring device.

Another object is to provide an improved tree anchoring device which provides wide base support while having only a single support rod extending upwardly from the ground surface.

A related object is to provide an improved tree anchoring device which presents only a minimum obstacle to a lawnmower.

Another object is to provide an improved tree anchoring device wherein the tree trunk is received between diverging contact fingers defining an open sided channel.

Another object is to provide an improved tree anchoring device having contact fingers which are easily vertically adjustable on a support rod.

Another object is to provide an improved tree anchoring device which is economical to manufacture, easy to install, simple and rugged in construction and efficient in operation.

SUMMARY OF THE INVENTION

The tree anchoring device of the present invention includes an upright elongated support rod and a plurality of circumferentially spaced apart and generally radially directed foot members connected to the lower end thereof. Each foot member includes a first prong connected to the support rod and extended generally perpendicularly therefrom and a second prong extended generally perpendicularly from the outer end of the first prong and generally parallel to the support rod for insertion into the ground. A pair of diverging contact fingers extend outwardly from the support rod for contacting a tree and supporting the tree in spaced relation from the support rod.

Accordingly, the present invention eliminates the unsightly jumble of ropes, wires, poles and stakes associated with prior tree anchoring systems and provides in their place one highly functional and attractive device. The tree anchoring device of the present invention may be easily installed by simply pushing the three base prongs into the ground. Mowing the grass around the tree anchoring device is facilitated because only a single support rod extends above ground. The contact fingers are readily vertically adjustable on the support rod and their outwardly diverging shape is adapted to accommodate most hand planted trees.

DESCRIPTION OF THE PREFERRED EMBODIMENTS

Figure 1:
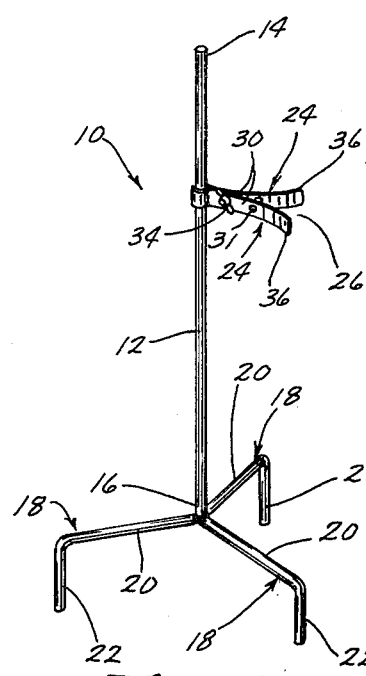
FIG. 1 is a perspective view of the tree anchoring device of the present invention.
Figure 2:
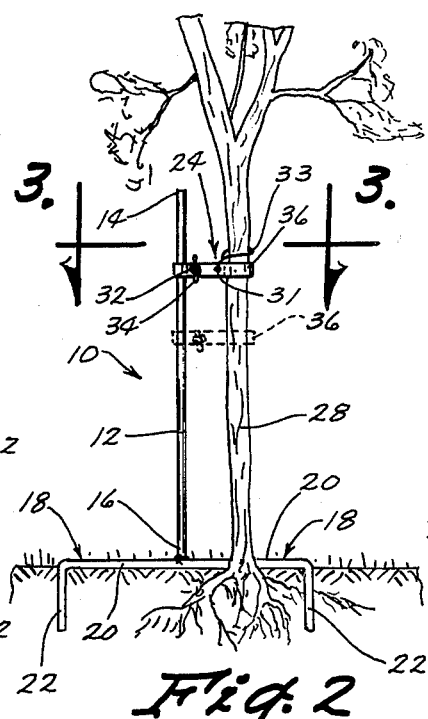
FIG. 2 is a partly sectional side elevational view of the tree anchoring device in use.

The tree anchor 10 of the present invention includes an upright elongated support rod 12 having upper and lower ends 14 and 16. A plurality of circumferentially spaced apart and generally radially directed foot members 18 are connected to the lower end 16 of the support rod. Each foot member 18 includes a first prong 20 which is connected to the support rod 12 and extended generally perpendicularly therefrom, and a second prong 22 extended generally perpendicularly from the outer end of the first prong 20 and generally parallel to the support rod 12 for insertion into the ground.

To support a tree in spaced relation from the support rod 12, there is provided a pair of contact fingers 24 which extend outwardly from the support rod 12 in diverging relation to define an open sided channel 26 in which a tree trunk 28 is received.

Figure 3:
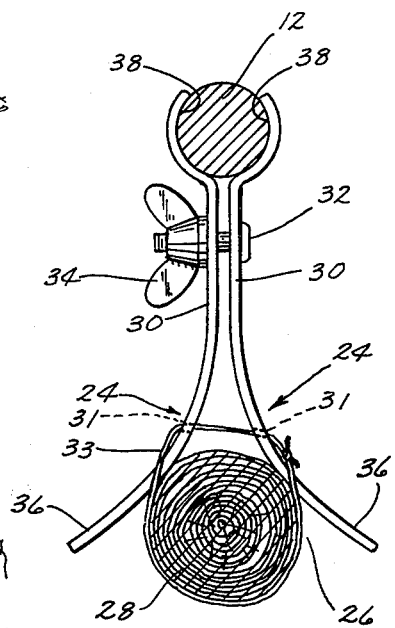
FIG. 3 is an enlarged detail top sectional view as seen on line 3—3 in FIG. 2.

Referring to FIG. 3, the contact finger 24 is formed from a strap of resilient spring like material and includes a central portion 30 through which a fastener such as bolt 32 is extended for clamping the central portions together by means of the finger actuated wing nut 34. The interior surfaces of the contact fingers 24 are shaped to define generally parallel central portions arranged between generally convex diverging end portions 36 and generally concave rod engaging end portions 38.

In operation, the support rod 12 is positioned in relatively closely spaced relation to a tree trunk 28, whereupon the vertically directed second prongs 22 of the foot members 18 are pushed into the ground to firmly anchor and stabilize the support rod. Next, it is a simple matter to arrange a pair of contact fingers with their rod engaging end portions 38 on opposite sides of the support rod 12 and their diverging end portions 36 in contact with the tree trunk. Bolt 32 is then inserted through aligned openings in the central portions of the contact fingers and wing nut 34 is tightened thereon to clamp the fingers onto the support rod at the desired height. It is apparent that by simply loosening the wing nut 34, the contact fingers are easily vertically adjustable on the support rod. A second pair of holes 31 are provided in central portion 30 to receive a cord or string 33 for tying the tree.

Figure 4:
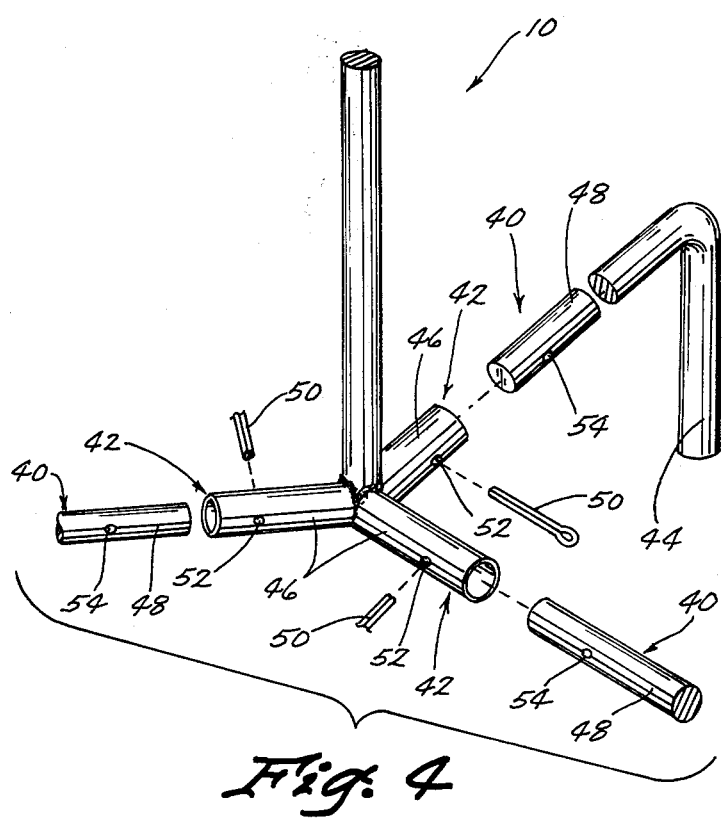
FIG. 4 is an enlarged, partially foreshortened and fragmented perspective view of an alternate embodiment for the foot members of the invention.

FIG. 4 illustrates an alternate embodiment for the foot members of the invention. In this embodiment, three foot members 40 each include a first prong 42 and a second prong 44 directed as in the first embodiment. But each first prong 42 includes a first portion 46 which is rigidly connected to the lower end 16 of the support rod 12 and a second portion 48 which is detachably secured to the first portion 46 to facilitate disassembly for shipping, packaging and the like. First portion 46 is shown as a tubular socket with the second portion 48 being formed as a rod adapted to be slide-fit within the socket 46 and releaseably retained therein by a cotter pin 50 insertable through aligned openings 52 and 54 in the first and second portions 46 and 48 respectively.

The wide base support afforded by the foot members 18 and the rigid securement of the foot members to the support rod 12 make the tree anchoring device of the present invention a very sturdy structure which therefore may be reused again and again. In addition to providing wide base support, the shape of the foot members 18 enables them to be disposed in ground engagement so as to present no obstacle to a lawnmower or passersby. The open channel shape of the contact fingers readily accommodates tree trunks of various sizes and has no binding effect which might be an obstacle to growth of the tree trunk.

Thus there has been shown and described a tree anchoring device which accomplishes at least all the stated objects.

I claim:
1. A tree anchoring device comprising,
an upright elongated support rod having upper and lower ends,
a plurality of circumferentially spaced apart and generally radially directed foot members connected to the lower end of said support rod,
each foot member including a first prong connected to said support rod and extended generally perpendicularly therefrom, and a second prong extended generally perpendicularly from an outer end of the first prong and generally parallel to said support rod for insertion into the ground, and
a pair of diverging contact fingers extended outwardly from said support rod at a position intermediate the upper and lower ends thereof for contacting a tree and supporting said tree in spaced relation from said support rod
said pair of contact fingers diverging outwardly and laterally from said support rod to define an open-sided generally V-shaped channel in which said tree is received,
said diverging fingers including rod engaging end portions opposite said diverging ends, said fingers having interior surfaces including generally parallel central portions, generally convex diverging end portions, and generally concave rod engaging end portions; and
fastening means urging said pair of contact fingers together so as to secure said contact fingers in clamping relation onto said support rod;
flexible tying means operatively connected to said diverging fingers, said tying means adapted to extend around the trunk of said tree for fixedly associating the tree anchoring device to the tree.

2. The tree anchoring device of claim 1 including three foot members arranged in uniformly spaced apart relation about said support rod.

3. The tree anchoring device of claim 1 wherein said first prong of a foot member includes a first portion rigidly connected to said support rod and a second portion detachably secured to said first portion whereby said second portion and second prong may be detached for shipping and the like.

4. The tree anchoring device of claim 3 wherein said first portion comprises a tubular socket and said second portion includes a rod adapted to be slide-fit within said socket and further comprising means for releasably retaining said rod within said socket.

5. The tree anchoring device of claim 1 wherein said fastening means is releasable for vertically adjusting the position of said contact fingers on said support rod.

6. The tree anchoring device of claim 1 wherein said contact fingers are formed of a resilient spring material.

* * * * *